No. 788,711. PATENTED MAY 2, 1905.
P. E. DOOLITTLE.
VEHICLE TIRE.
APPLICATION FILED MAY 17, 1904.

Witnesses
Jas. H. Blackwood
A. W. Pentland

Inventor
Perry E. Doolittle
by M. H. Doolittle
Attorneys

No. 788,711.

Patented May 2, 1905.

UNITED STATES PATENT OFFICE.

PERRY ERNEST DOOLITTLE, OF TORONTO, CANADA.

VEHICLE-TIRE.

SPECIFICATION forming part of Letters Patent No. 788,711, dated May 2, 1905.

Application filed May 17, 1904. Serial No. 208,367.

*To all whom it may concern:*

Be it known that I, PERRY ERNEST DOOLITTLE, a subject of the King of Great Britain, residing at Toronto, in the county of York, Province of Ontario, Dominion of Canada, have invented new and useful Improvements in Vehicle-Tires, of which the following is a specification.

My invention relates to supplemental tires adapted to be used in conjunction with pneumatic-tired wheels; and its object is to provide such a construction of supplemental tire and supporting-rim therefor as may be readily applied to and detached from the rim or felly of the wheel and used in place of the pneumatic tire either when the pneumatic tire is punctured or otherwise injured so as to cause it to collapse or when on account of the slippery condition of the road it is desired to substitute for the pneumatic tire a hard tread-surface, such as will prevent slipping or skidding of the wheel and at the same time such a construction as will enable the supplemental tire when substituted to so coöperate with the pneumatic tires of the other wheels of the vehicle as to maintain the true and even bearing of the vehicle upon the surface of the road.

To these ends my invention is embodied in preferable form in the construction hereinafter described, and illustrated in the accompanying drawings.

Figure 1:
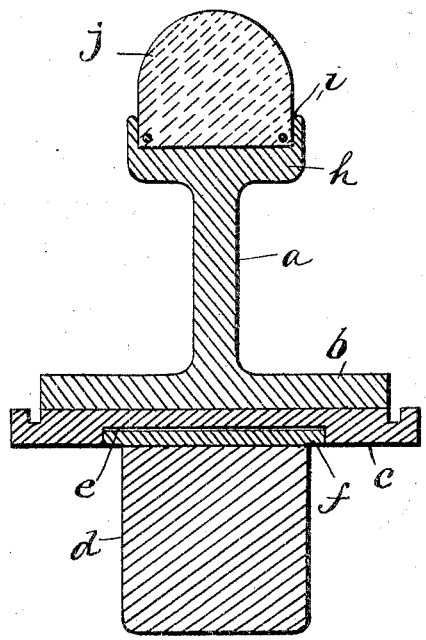
Figure 2:
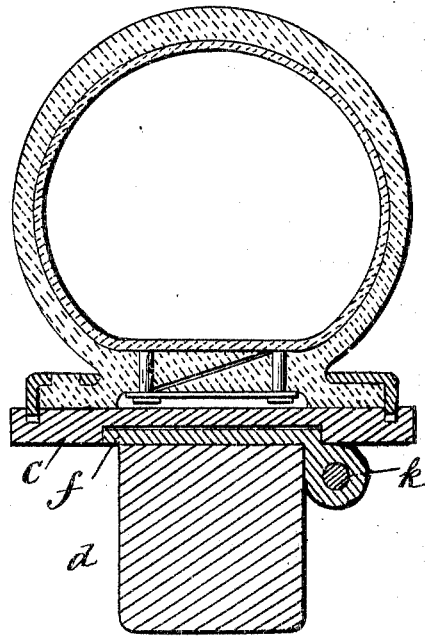
Figure 3:
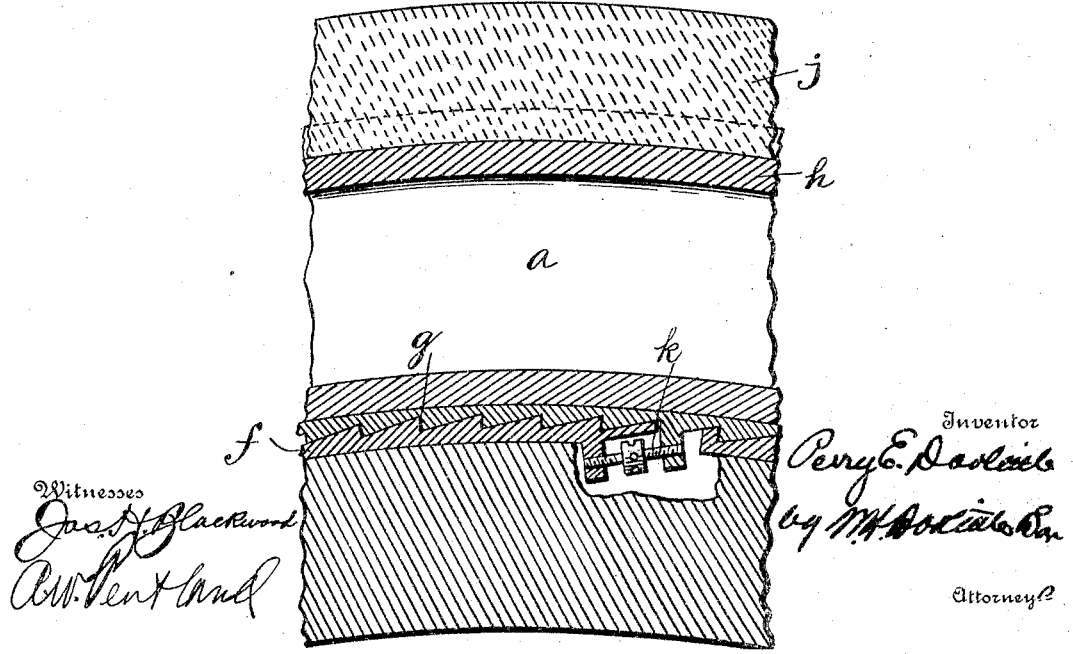

In the drawings, Figure 1 is a vertical cross-section of my supplemental tire and rim applied to the felly of a wheel. Fig. 2 is a similar view illustrating an ordinary pneumatic tire applied to the same kind of felly and which may be used on another wheel of the same vehicle at the same time that the supplemental rim and tire are employed on one of the wheels, and Fig. 3 is a longitudinal vertical section broken away through said supplemental tire and rim and the wheel-felly.

The means for attachment of the rim of the pneumatic tire and also of the supplemental rim to this felly as shown and described in this application are the same as those set forth in my pending application for United States Letters Patent, Serial No. 182,169, filed November 21, 1903, for vehicle-tires; but it is clear that my invention may be employed in connection with other means of attachment of the rim to the felly and is not limited in its application to such specific form of attachment.

Referring to the drawings, $a$ designates a long circumferential radially-extending shank of the supplemental rim of my invention, and $b$ designates a broad flat circumferential base of said rim. This base corresponds in width to and is adapted to be fitted upon the iron tire-rim $c$, which is normally adapted to receive the pneumatic tire. Between the rim $c$ and a felly $d$ and mounted in a channel $e$ in the former is a circumferentially-expansible band $f$. The inner face of the rim $c$ and the outer face of the band $f$ are provided with corresponding engaging teeth or inclined projections $g$, which are adapted to ride one upon the other or close together in order to either force the band $f$ out against the rim $c$ to clamp the rim to the felly or to permit the contraction of the band in order to release said rim from the felly and permit it to be removed therefrom.

The outer end of the supplemental rim is provided with a widened head $h$, having a channel $i$, adapted to receive a solid-rubber tire $j$, which may be of ordinary construction, but which need be but of very slight thickness. If preferred, the supplemental tire $j$ may be almost entirely made of some unyielding material and provided with only a slight resilient lining. The band $f$ may be provided with any suitable means, such as a two-way screw $k$, for tightening up or releasing the band against the rim.

In practice should any one of the tires of the different wheels of the vehicle become collapsed by bursting or through a puncture or should it be desirous to provide means on one of the driving-wheels to prevent slipping or skidding of the wheels on a slippery surface it is merely necessary to loosen the main tire-rim by contracting the band $f$, by means of the screw-bolt $k$, and then slipping this main pneumatic-tire rim off the felly and then placing the supplemental rim with its solid tire or tread-surface already in place on the main tire-rim $c$ and again clamping the tire-rim to the felly by means of the expansible band $f$.

The construction of the supplemental rim is such that with a small tread-surface the bearing-periphery of the wheel to which the supplemental tire and rim may be attached is carried out to the level of the bearing-surface of the pneumatic tire, and hence the supplemental rim and tire will coöperate with the tires of the other wheels to maintain a true bearing of the vehicle-wheels, while at the same time avoiding a hard non-slipping and a non-puncturable tread-surface for the wheel to which it is applied.

It is clear that changes may be made in the details of the device without departing from the scope of my invention.

Having thus described my invention, what I claim is—

1. In a vehicle adapted to be provided with pneumatic tires a removable supplemental rim, means to attach said rim to the felly or rim of the pneumatic tire when the pneumatic tire is removed, said supplemental rim having a hard-surfaced tread portion and having a radially-extending connecting portion between the tread portion and the base projecting outward to carry the hard-surfaced tread portion to the same distance from the center of the wheel as the periphery of the pneumatic tire, substantially as described.

2. In a vehicle employing pneumatic tires in combination with the wheels of said vehicle and pneumatic tires on one or more of said wheels a supplemental rim carrying a hard tread portion, means to fit said supplemental rim on the wheel-rim or felly in place of the pneumatic tire a base for said supplemental rim a tread-portion-holding part and a radially-extending connecting part between the base and tread-holding part of sufficient length to carry said tread portion out to the bearing-level of the periphery of said other pneumatic tires, substantially as described.

In testimony whereof I have signed my name to this specification in the presence of two subscribing witnesses.

PERRY ERNEST DOOLITTLE.

Witnesses:
MARGARET A. GLEESON,
JAS. P. MACGREGOR.